United States Patent
Dax et al.

[15] 3,648,284
[45] Mar. 7, 1972

[54] TWO-FACE PHASED ARRAY

[72] Inventors: Peter R. Dax; Thomas M. Moore, both of Severna Park, Md.

[73] Assignee: Westinghouse Electric Corporation, Pittsburgh, Pa.

[22] Filed: Aug. 6, 1969

[21] Appl. No.: 847,833

[52] U.S. Cl. ...................... 343/5 R, 343/100 SA, 343/854
[51] Int. Cl. ........................ G01s 9/02, H01q 3/26
[58] Field of Search ................ 343/100 SA, 5 R, 854

[56] References Cited

UNITED STATES PATENTS 3,430,242  2/1969  Safran ...................... 343/100 SA

*Primary Examiner*—T. H. Tubbesing
*Attorney*—F. H. Henson and E. P. Klipfel

[57] ABSTRACT

A phased array consisting of two radiating faces back-to-back with time shared solid-state transmit circuits disposed therebetween for enabling each of the radiating faces in a high-duty cycle operating mode to optimize utilization of the solid-state capabilities of the transmit circuits.

4 Claims, 6 Drawing Figures

INVENTORS
Peter R. Dax and
Thomas M. Moore

BY *Ernest P. Klipfel*
ATTORNEY

TWO-FACE PHASED ARRAY

BACKGROUND OF THE INVENTION

1. Field of the Invention

The present invention relates generally to search radars and generally relates to solid state phased arrays disposed to better utilize the average power capabilities of solid state transmitters.

2. Description of the Prior Art

Solid state transmitters are generally peak power limited only, as opposed to tube transmitters which have both peak power and average power limitations. Hence, better utilization of the power handling capabilities of solid state transmitters is made by transmitting long pulses which are subsequently compressed. There is, however, a limit to the length of the pulse that can be transmitted principally because there is a practical limit to the degree of pulse compression. The transmitter average power obtainable with the arrangement of conventional systems is therefore well below the level representing optimum utilization of the power handling capabilities of solid state devices.

In addition, when attempting to search a large volume by means of a rapidly scanned pencil beam such as in long range search radars, the resultant single pencil beam search time leads to unacceptable data rates even with a short transmitted pulse, programmed pulse repetition frequency and a single hit on target per beamwidth.

The combination of the present invention provides the desired high duty cycle operating mode for solid state transmitters, combined with doubling the data rate from the system. Two information beams are generated with little increase in dwell time.

An object of the present invention is to provide a phased array capable of utilizing the high duty cycle operating mode which can be provided with solid state devices.

Another object of the present invention is to provide a phased array capable of generating two information beams in a dwell time which is increased by a relatively small amount.

SUMMARY OF THE INVENTION

Briefly, the present invention accomplishes the above cited objects and other objects and advantages by providing two radiating faces disposed back to back and time shared transmit circuits positioned between the faces to time share the power output capabilities of the solid state devices.

BRIEF DESCRIPTION OF THE DRAWING

Further objects and advantages of the present invention will be readily apparent from the following detailed description taken in conjunction with the drawing in which.

DESCRIPTION OF THE PREFERRED EMBODIMENTS

Figure 1:
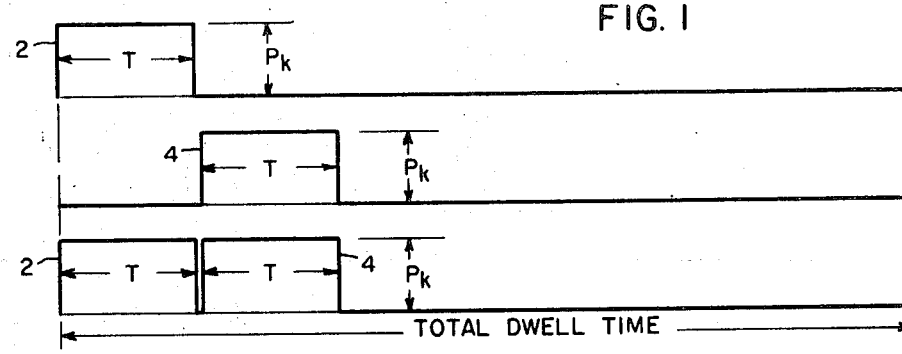
FIG. 1 is a graphical illustration useful in understanding the operation of the present invention.

FIG. 1 graphically illustrates the operation of the present invention. It is well known that the detection range of a radar is a function of the amplitude and duration of the transmitted pulse. Transmitters of the solid state type can be operated continuously at peak power since heat dissipation is not as much of a problem as it is with conventional tube transmitters. Solid state transmitters are therefore capable of generating an additional pulse to be transmitted as soon as the first pulse is completed.

FIG. 1, for example, illustrates a first pulse 2 of height $P_k$ and duration T being generated by a solid state transmitter. A second pulse 4 of a similar power amplitude and duration can be generated immediately after the first pulse 2 for radiation by another antenna or radiating element. It can be seen that by adding a second pulse 4 for transmission immediately after transmission of the pulse 2, the total dwell time is increased only by the individual pulse duration T.

Figure 2:
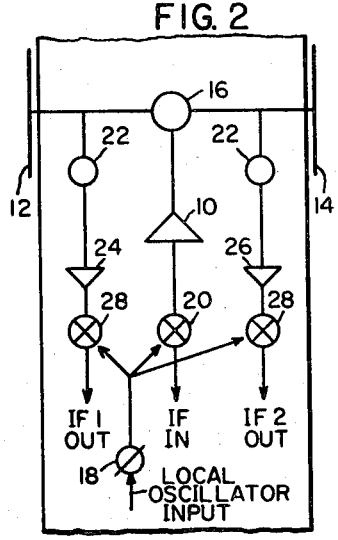
FIG. 2 is a schematic diagram of an illustrative embodiment of the present invention.

FIG. 2 schematically illustrates the disposition of a solid state transmitter 10 selectively feeding radiating elements 12 and 14 through a selector switch 16. A local oscillator input through phase shifter 18 is combined in mixer 20 to determined the frequency and phase of the transmission from the elements 12 and 14. Isolator switches 22 control the connection of receivers 24 and 26 to echoes of the radiated pulses which are also received by the radiating elements 12 and 14. Mixers 28 combine with the local oscillator input through phase shifter 18 to provide an IF output as received by either of the radiating elements 12 or 14.

Each radiating element 12 and 14 is a portion of two reflective radiating faces 30 and 32. The single two-faced array illustrated in FIG. 3 may be mounted on a pedestal 34 and rotated at 36 to direct the beam from each face in a rotational manner.

Figure 3:
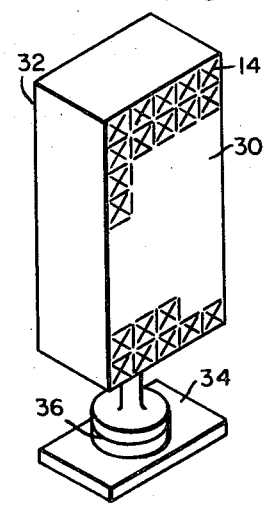
FIG. 3 is an illustration of a physical embodiment of the present invention.
Figure 4:
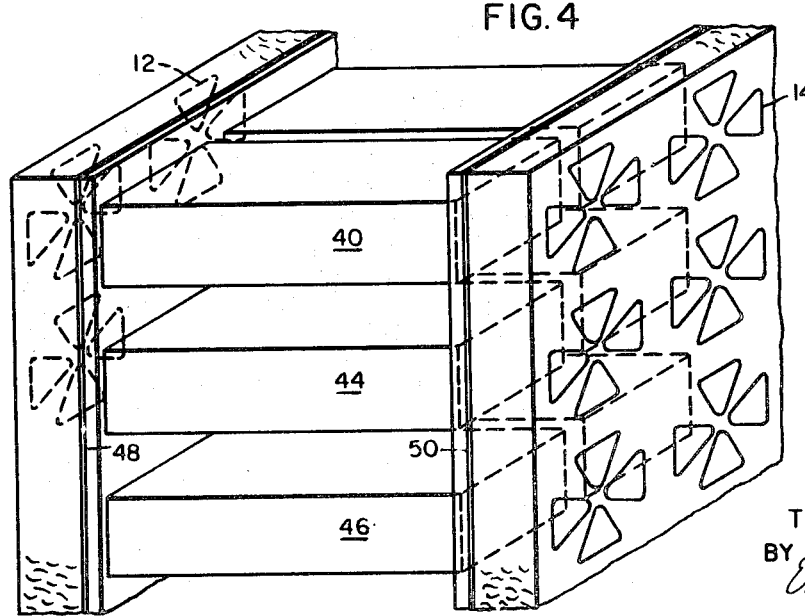
FIG. 4 is an enlarged perspective showing of a portion of the illustrative embodiment shown in FIG. 3.

FIG. 4 shows an enlarged section of a portion of the illustrative embodiment of FIG. 3. Transmit-receive circuitry associated with each pair of radiating elements is mounted between the two elements which are driven as a pair. Transmit-receive stage 40 controls both radiating elements 12 and 14. Similar transmit-receive circuitry 44 and 46 each contain identical elements.

From FIG. 3 then it can be seen that the present invention consists of two radiating faces disposed back to back with time shared solid state transmitters located therebetween. Two long pulses are transmitted in succession, one on each side of the array. The two pulses are on different frequencies thus enabling the receivers to operate independently. Further isolation is provided in addition by the ground planes 48 and 50 behind each radiating face.

The present invention provides the desired high duty cycle operating mode for the solid state transmitter 10, combined with a high data rate from the system; two information beams are provided with a negligible increase in dwell time.

Figure 5:
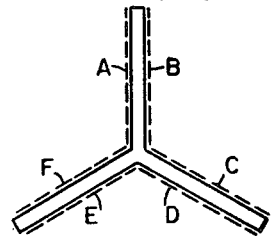
FIG. 5 illustrates the use of the present invention for 360° without mechanical rotation.
Figure 6:
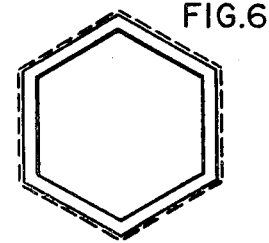
FIG. 6 shows a phased array with equivalent performance with the present state of the art.

FIG. 5 illustrates the application of two-faced phased arrays in combination to provide 360° coverage without mechanical rotation. In the Y configuration of FIG. 5 six beams are transmitted practically simultaneously. Further there is no shadowing effect of one face upon another. The transmitters in each array are still being time shared between two faces: i.e., pulses are transmitted from faces AC and E to be followed immediately by pulses from BD and F. Such arrangement has the same performance with about half the size of the conventional hexagonal phased array of the prior art shown in FIG. 6.

The two-faced array in accordance with the present invention therefore provides a 2:1 size and weight advantage over a conventional array with the same performance.

While the present invention has been described with a degree of particularity with the purposes of illustration, it is to be understood that all modifications, substitutions and alterations within the spirit and scope of the present invention are herein meant to be included.

What is claimed is:

1. An antenna structure comprising, in combination:
    two phased arrays disposed back to back with their radiation patterns directed in opposite directions;
    and transmit-receive means positioned between said phased arrays for transmitting radio signals simultaneously and receiving simultaneously echo signals on said arrays.

2. The combination of claim 1, including means for transmitting said radio signals on different frequencies.

3. The combination of claim 1, wherein said structure includes three planar arms disposed in a Y configuration.

4. The combination of claim 1, wherein each array includes a plurality of radiating and receiving elements; each of said elements being paired with an element of the other array; and said transmitoreceive means further comprising a plurality of individual transmitters and receivers for each set of paired radiating elements.

* * * * *